July 14, 1959 V. E. BOLING 2,894,417
VARIABLE SPEED TRANSMISSION
Filed Nov. 8, 1957 2 Sheets-Sheet 2

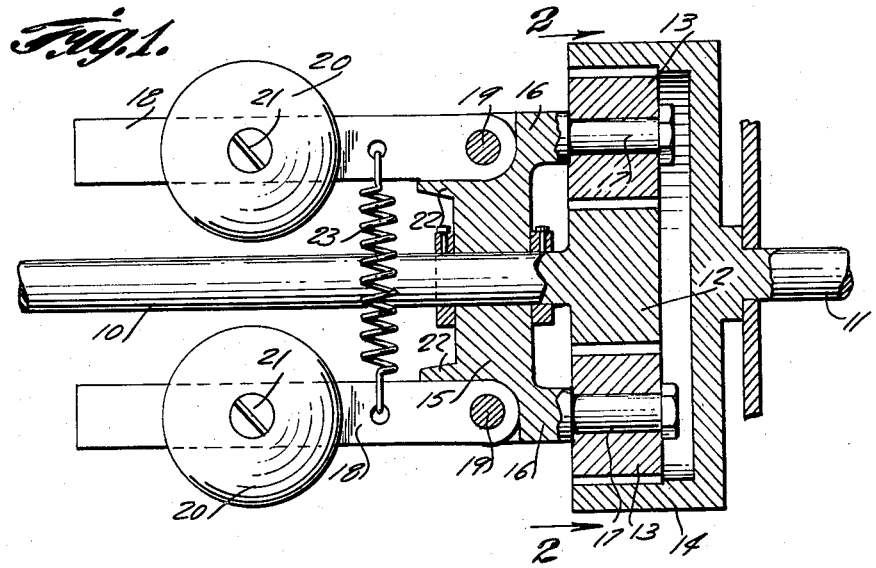
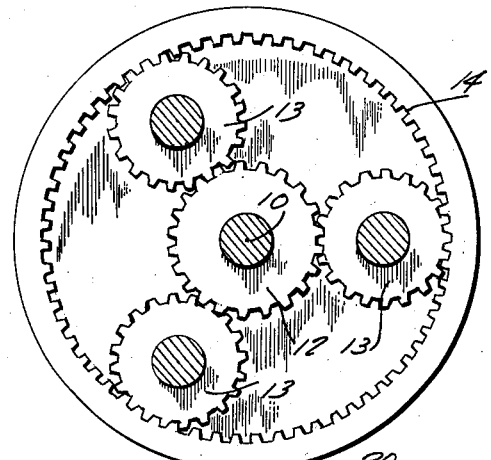
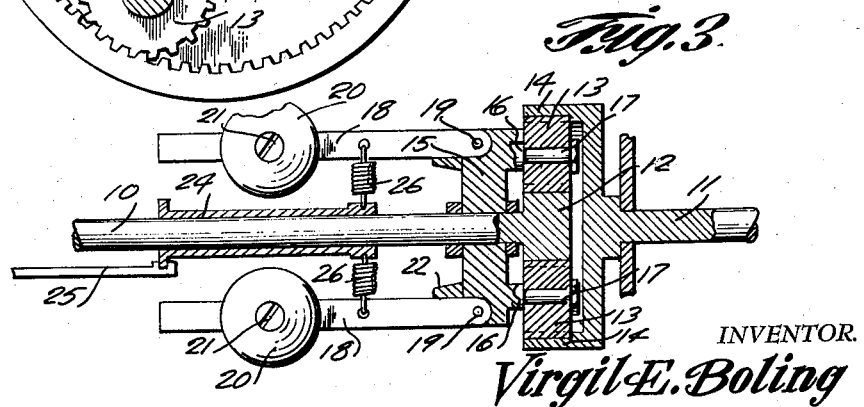

INVENTOR.
Virgil E. Boling
BY Victor J. Evans & Co.
ATTORNEYS

United States Patent Office 2,894,417
Patented July 14, 1959

2,894,417

VARIABLE SPEED TRANSMISSION

Virgil E. Boling, Lockhart, Tex.

Application November 8, 1957, Serial No. 695,360

2 Claims. (Cl. 74—751)

This invention relates to a variable speed transmission.

The object of the invention is to provide a variable speed transmission which is adapted to provide an operative connection between an input and an output shaft.

Another object of the invention is to provide a variable speed transmission for use with an input and an output shaft, wherein the motion and/or power is permitted to take two paths through the device, and wherein speed can be changed or regulated by changing the effective leverage of centrifugal weights.

A further object of the invention is to provide a variable speed transmission which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a sectional view illustrating one form of the variable speed transmission of the present invention.

Figure 2 is a sectional view taken on the line 2—2 of Figure 1.

Figure 3 is a sectional view illustrating a modified variable speed transmission.

Figures 4, 5:
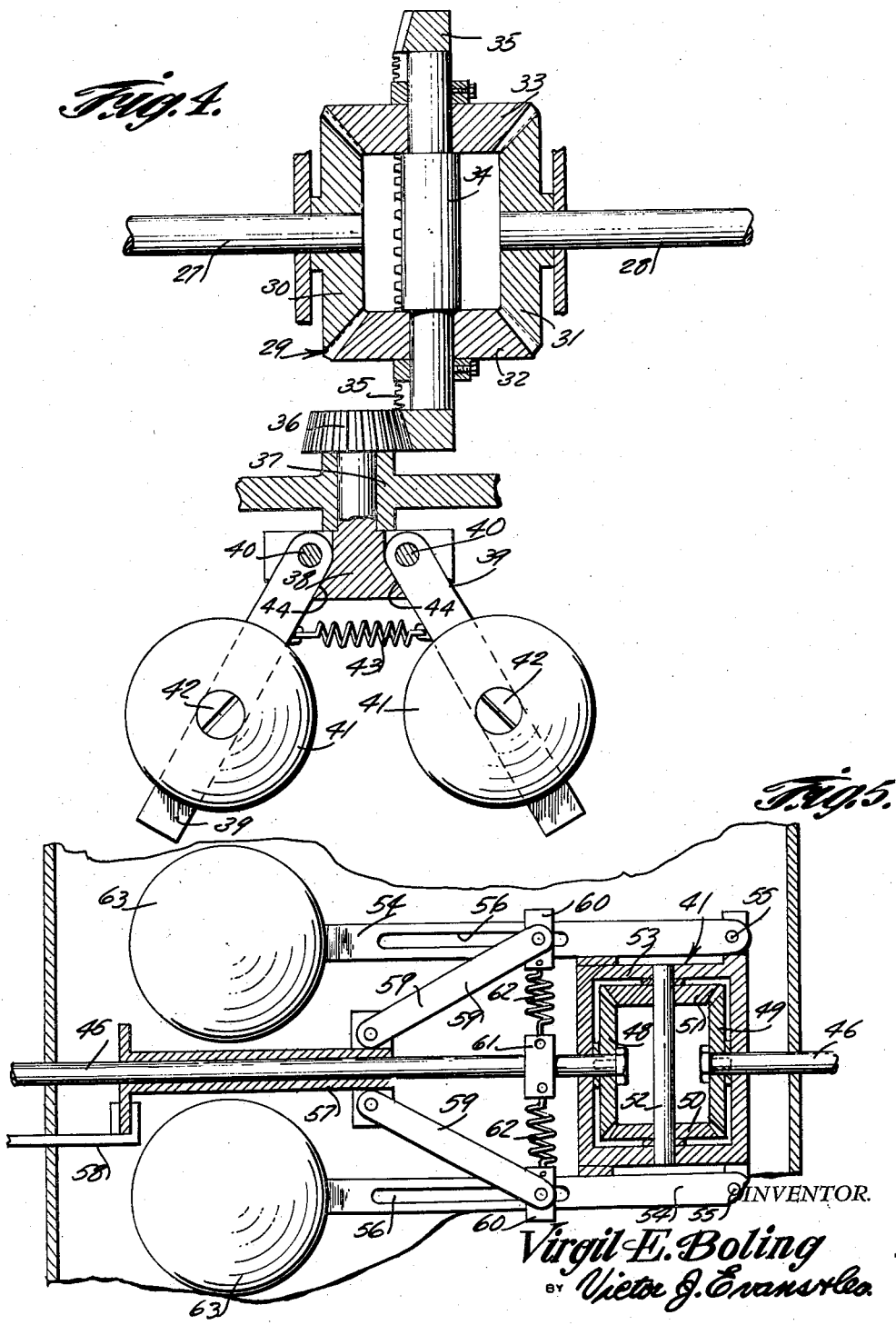
Figure 4 is a sectional view illustrating a still further modification.
Figure 5 is a sectional view illustrating a further modification.

Referring in detail to the drawings, and more particularly to Figures 1 and 2 of the drawings, the numeral 10 indicates an input shaft and the numeral 11 indicates an output shaft, and arranged on an end of the input shaft 10 is a sun gear 12. A plurality of planet gears 13 mesh with the gear 12, and a ring gear 14 is connected to the output shaft 11. Support members 16 extend from the carrier 15, and pins 17 may be provided for connecting the sun gears 13 to the support members 16. As shown in the drawings, there is provided a pair of arms 18 which are pivotally connected to the carrier 15 through the medium of pivot pins 19, and weights 20 are connected to the arms 18 by means of securing elements 21, and such securing elements 21 are illustrated in the drawings. There is further provided stop members 22 on the carrier 15, and the stop members 22 serve to limit inward pivotal movement of the arms 18. The numeral 23 indicates a coil spring which extends between the pair of arms and which is connected thereto.

Referring to Figure 3 of the drawings, there is shown a modification wherein a sleeve 24 is slidably mounted on the input shaft 10, and a control rod 25 is connected to the sleeve 24. The numeral 26 indicates coil springs which extend between an end of the sleeve 24 and the arms 18, and the coil springs 26 are adapted to be used in lieu of or in place of the coil spring 23.

Referring now to Figure 4 of the drawings, there is shown a further modification wherein the numerals 27 and 28 indicate input and output shafts, and the numeral 29 indicates a differential connection between the shafts 27 and 28. The differential 29 includes first and second bevel gears 30 and 31 which are connected to the shafts 27 and 28, and meshing with the bevel gears 30 and 31 are bevel gears 32 and 33. A drive shaft 34 has portions thereof extending through the gears 32 and 33, and the shaft 34 is connected to a circular gear wheel 35. The numeral 37 indicates a driven shaft which has a gear member 36 that meshes with the gear wheel 35, and a carrier 38 is connected to the shaft 37. A pair of arms 39 are pivotally connected to the carrier 38 by means of pivot pins 40, and the carrier 38 is provided with stop shoulders 44 for liimting inward pivotal movement of the arms 39. Weights 41 are connected to the arms 39 in any suitable manner, as for example by means of securing elements 42, and a coil spring 43 extends between the pair of arms 39 and is connected thereto.

Referring now to Figure 5 of the drawings, there is shown a still further modification, and in Figure 5 the numerals 45 and 46 designate input and output shafts. A differential 47 interconnects the shafts 45 and 46 together, and the differential 47 includes first and second bevel gears 48 and 49 which are connected to the shafts 45 and 46 respectively. Third and fourth bevel gears 50 and 51 mesh with the gears 48 and 49. A gear carrier shaft 52 extends through the gears 50 and 51, and the gear carrier shaft 52 is connected to a carrier 53. A pair of arms 54 are pivotally connected to the carrier 53 as at 55.

The arms 54 are provided with slots 56, and slidably mounted on the input shaft 45 of the sleeve 57. A control rod 58 is connected to the sleeve 57, and links 59 extend between the sleeve 57 and brackets 60 which are adjustably connected to the slotted portion of the arms 54. The numeral 61 indicates a body member that is slidably mounted on the shaft 45, and coil springs 62 extend between the body member 61 and brackets 60 as shown in the drawings.

From the foregoing, it is apparent that there has been provided a variable speed transmission which utilizes gears. The variable speed transmission of the present invention may consist of a planetary gear arrangement as shown in Figs. 1, 2 and 3, or it may consist of a differential gear arrangement or the like as shown in Figs. 4 and 5. It is to be noted that with the present invention, the motion and/or power is permitted to take two paths through the device, and either path will take all or any part of the motion and no clutch is required. One path goes to a revolution per minute limiting device while the other path goes into useful power output through the shaft 11.

The revolution per minute limiting device functions as a flywheel below and at the speed for which it is set by the spring tension such as the tension of the spring 23 or the tension of the springs 26, or 43 or 62. It requires no more energy to revolve than a flywheel at this point and it will require more power to revolve it faster for which it is set than that available for the power source or that required from the output of the transmission.

Basically, the revolution per minute limiting device consists of a flywheel governor with an adjustable spring tension, and the spring tension may be changed by any suitable means which may be manual or automatic. For example, by means of the control rod 25 the sleeve 24 can be moved so as to vary the tension on the springs 26. Similarly, by actuating the rods 58, the sleeve 57 will move so as to change the tension on the springs 62 in Figure 5. The fly balls such as the balls or weights 20, stay tightly closed until centrifugal force is sufficient to counteract the spring tension.

The input and output shaft rotate in opposite directions. The speed can be changed by changing the effective leverage of the centrifugal weights such as the weights 20.

In the device shown in Figure 4, there is shown a differential unit 29 but it is to be understood that planetary gears can also be utilized. The revolution per minute limiting device of Figure 4 can be arranged around either input or output shaft, and the spring 43 may be made adjustable so that the tension can be varied to vary the speed. By making the spring 23 adjustable, the speeds can be changed by controlling the tension on the member 23.

Thus, it will be seen that there are several variations and in one form of the invention a standard planetary gear arrangement is used, while in the other form a standard differential gear arrangement is used. According to the present invention there is provided a means for controlling the speed of the planetary gear without absorbing energy, that is no more than from friction or inertia, from the input shaft. The present invention is a centrifugal device which is variable at the operator's control by changing the tension of the springs or by changing similar devices, or by changing the effective leverage of the weights.

It is to be understood that when power is applied at the input shaft, the gear carrier will accelerate until the centrifugal force of the weights equals the set tension of the springs. At this point, the weights will start to move outward which requires more energy than heretofore from the input shaft. Instead, the output shaft will revolve. The torque on the output shaft such as the shaft 11 is now equal to the tension of the spring.

All that is required to obtain a variable output speed is to vary the tension of the springs to equal that required by the output shaft. When the centrifugal force from the weights equals the tension, instead of the weights swinging outward and still accelerating, they will stay at that speed and the motion will then go to the output shaft.

The input shaft may vary in speed any above the given setting, and the governor device will stay at the set speed and the output shaft will vary almost exactly with the input shaft. At any point above the given setting, the gears will function as reduction gears. Thus, at maximum tension, the input shaft such as the shaft 10 or the shafts 27 or 45, could revolve at maximum speed and the output shaft would not revolve at all, so that no clutch is required. At no time do the input and output shafts turn at equal speed. The input and output shafts rotate in opposite directions from each other. Gears 32 and 33 are loosely mounted on shaft 34.

The various weight arms are provided with stop shoulders to limit inward pivotal movement of these arms. Any suitable means can be provided for changing the tension of the springs. The total maximum tension of the springs will more than equal the maximum foot pounds torque required by the output shaft.

Instead of using the differential unit 47 shown in Figure 5, a suitable planetary unit can be utilized. In the arrangement shown in Figure 5, there is shown a means of control by changing the effective leverage of the weights 63 which are connected to the arms 54.

It is to be understood that the present invention is not limited to a pair of arms or weights. Furthermore, the member 61 may be slidably mounted on the shaft 45 or it can be eliminated entirely.

Minor changes in shape, size and rearrangement of details coming within the field of invention claimed may be resorted to in actual practice, if desired.

I claim:

1. In a variable speed transmission, an input shaft and an output shaft, a differential unit connecting said input and output shafts together, said differential unit comprising first and second bevel gears, said first bevel gear being connected to said input shaft and said second bevel gear being connected to said output shaft, third and fourth bevel gears meshing with said first and second bevel gears, a gear carrier shaft connected to said third and fourth bevel gears, a carrier connected to said gear carrier shaft, a pair of arms pivotally connected to said carrier, weights connected to said arms, a sleeve slidably mounted on said input shaft, a control rod connected to said sleeve, brackets slidably connected to said arms, links extending between said brackets and sleeve, a body member slidably mounted on said input shaft, and coil springs extending between said body member and brackets.

2. In a variable speed transmission as in claim 1, wherein stop members are provided on said carrier for limiting inward pivotal movement of said arms.

References Cited in the file of this patent

UNITED STATES PATENTS

| | | |
|---|---|---|
| 555,438 | Dow | Feb. 25, 1896 |
| 1,127,251 | Hunt | Feb. 2, 1915 |
| 1,785,338 | Coleman | Dec. 16, 1930 |
| 1,928,244 | Berlin | Sept. 26, 1933 |

FOREIGN PATENTS

| | | |
|---|---|---|
| 362,964 | France | July 18, 1906 |
| 363,985 | Great Britain | Dec. 24, 1931 |
| 747,244 | France | June 3, 1933 |